(12) United States Patent
Wilkes

(10) Patent No.: US 6,853,984 B1
(45) Date of Patent: Feb. 8, 2005

(54) METHOD AND APPARATUS FOR CREDIT CARD PROCESSING VIA FACSIMILE

(75) Inventor: W. Bradley Wilkes, Alpine, UT (US)

(73) Assignee: Propay U.S.A., Inc., Orem, UT (US)

( * ) Notice: Subject to any disclaimer, the term of this patent is extended or adjusted under 35 U.S.C. 154(b) by 1146 days.

(21) Appl. No.: 08/835,404

(22) Filed: Apr. 8, 1997

(51) Int. Cl.[7] .................................................. G06F 17/60
(52) U.S. Cl. ............................. 705/44; 705/26; 705/35; 705/38; 705/39; 705/42
(58) Field of Search ............................. 705/44, 26, 35, 705/38, 39, 42

(56) References Cited

U.S. PATENT DOCUMENTS

| | | |
|---|---|---|
| 4,860,341 A | 8/1989 | D'Avello et al. |
| 4,960,981 A | 10/1990 | Benton et al. |
| 5,239,462 A | 8/1993 | Jones et al. |
| 5,265,008 A | 11/1993 | Benton et al. |
| 5,333,868 A | 8/1994 | Goldfarb |
| 5,457,305 A | 10/1995 | Akel et al. |
| 5,590,197 A * | 12/1996 | Chen et al. .................... 380/24 |

FOREIGN PATENT DOCUMENTS

TR    WO 02/059849 A1 *   1/2001   ........... G06F/17/60

OTHER PUBLICATIONS

"GMAC;s 10–Minute Credit Review", PR Newswire, p. 0320DETH034, Mar. 20, 1997.*
Radigan, Joseph. "Fighting over Internet payments," US Banker, v. 106 n. 2, p. 43–45, Feb. 1996.*

* cited by examiner

Primary Examiner—V. Millin
Assistant Examiner—Charles R. Kyle
(74) Attorney, Agent, or Firm—Morriss O'Bryant Compagni, P.C.

(57) ABSTRACT

A method and apparatus for making credit card transactions which includes utilizing a facsimile machine for transmitting credit card information and purchase amount to an information processing center. The information processing center receives and converts the received information into an electronic format, and then accesses credit card account information via the Internet. A final disposition of the purchase is then transmitted to the merchant via facsimile which is either approval or disapproval of the transaction.

22 Claims, 3 Drawing Sheets

METHOD AND APPARATUS FOR CREDIT CARD PROCESSING VIA FACSIMILE

BACKGROUND

1. The Field of the Invention.

This invention relates generally to financial transactions via telephone. More specifically, the present invention provides a method and apparatus for accomplishing a credit card purchase utilizing facsimile technology and internet access, thereby avoiding the dedicated credit card transaction equipment which is typically required.

2. The State of the Art

The state of the art process for making credit card transactions is efficient but costly. It is costly in that to process credit card transactions requires purchasing or renting the equipment necessary for making the transactions. Furthermore, there are additional charges involved. Specifically, there is an access fee charged to those who want to approve a credit card transaction.

The apparatus described above is typically arranged as shown in prior art FIG. 1. FIG. 1 shows a credit card magnetic reader machine 10. The magnetic reader 10 is also known as and will be referred to hereinafter as a "swipe" machine which describes the motion of placing a credit card along a track or channel 12 in the swipe machine 10, and then pulling the credit card through the channel. As the credit card is pulled through the channel 12, information stored on a magnetic strip on the credit card is "read" and transmitted to a credit card processing center 14. To transmit the information from the credit card to the processing center 14 typically requires the use of a dedicated telephone line 16. The swipe machine 10 is electrically coupled to a telephone 18 or directly to the dedicated telephone line 16.

The process of transacting a purchase utilizing the swipe machine 10 can be as follows. First, a customer provides the credit card to a merchant. The merchant initializes the swipe machine 10 by activating a connection between the swipe machine 10 and the processing center 14. Activating the connection can be as simple as swiping the credit card through the swipe machine 10, or pressing a button which causes the swipe machine to make a call to the processing center 14. After the connection is established, the credit card is swiped through the channel 12, or if already swiped, the information which typically includes the unique credit card number is transmitted to the processing center 14. Along with the unique credit card number, the merchant also transmits a purchase amount which is to be transferred electronically. As the name implies, the transfer is typically a crediting of a merchant's account by debiting of the customer's credit card account by posting a charge against the account.

At this stage of the process, the merchant typically returns the credit card to the customer because it will probably not be needed again. The processing center 14 is now typically using the unique credit card number to locate an account which is associated therewith. After the account is located, the processing center 14 determines whether the purchase amount entered by the merchant exceeds the credit limit of the credit card account. If the credit limit is not exceeded, the processing center 14 transmits an approval code back to the merchant. If the transaction is approved, the customer then leaves with the purchase.

The process described above can vary slightly for many reasons. For instance, the process can vary according to the type of credit card account which is being utilized for the transaction. For example, even if a credit limit is exceeded, the transaction might still be approved, within certain limits. Other variations include automating the process so that the credit card is swiped by the machinery, and only the purchase price has to be manually entered. However, none of these variations are particularly relevant to the present invention. What is important to learn from the background information above is that typically no transaction takes place without having a swipe machine 10 which can read the credit card number from the credit card. Furthermore, the swipe machine 10 functions as a dedicated link to the processing center 14, supplying the necessary information for the processing center 14 to determine whether the transaction is allowable in light of a credit limit and present debt associated with the credit card number.

It should be apparent from the explanation above that the equipment necessary for setting up a merchant with the ability to make credit card transactions is simply a credit card swipe machine 10. However, the fee structure associated with the swipe machine 10 is surprising. For instance, the typical cost of a swipe machine 10 is around $1000. Even if a swipe machine is rented, the cost is typically around $40.00 per month. Furthermore, there is typically a fee associated with accessing the processing center 14 via a swipe machine 10.

It would be an improvement over the state of the art to provide a method and apparatus for making credit card transactions which did not require the use of a credit card swipe machine. It would be a further improvement to eliminate or substantially reduce initial start-up costs of making credit card transactions, and possibly reduce the cost of accessing the processing center information.

OBJECTS AND SUMMARY OF THE INVENTION

It is an object of the present invention to provide a method and apparatus for making credit card transactions with essentially no investment in dedicated transaction equipment.

It is another object to provide a method and apparatus for making credit card transactions which does not require the use of a credit card swipe machine.

It is another object to provide a method and apparatus for making credit card transactions which avoids a high initial start-up cost.

It is another object to provide a method and apparatus for making credit card transactions which utilizes facsimile transmission technology, optical character recognition software, and internet access equipment.

It is another object to provide a method and apparatus for making affordable credit card transactions to merchants who would not otherwise perform enough transactions to justify the initial costs of conventional credit card transaction equipment.

The present invention is realized in a method and apparatus for making credit card transactions which includes utilizing a facsimile machine for transmitting credit card information and purchase amount to an information processing center. The information processing center receives and converts the received information into an electronic format, and then accesses credit card account information via the Internet. A final disposition of the purchase is then transmitted to the merchant via facsimile which is either approval or disapproval of the transaction.

In a first aspect of the invention, the merchant only needs to have a facsimile machine for transmitting credit card and purchase amount information. This eliminates the need for a dedicated credit card swipe machine.

In another aspect of the invention, optical character recognition software converts the credit card and purchase amount information to an electronic format, a format which is therefore suitable for transmission to a credit card processing center.

In another aspect of the invention, the total cost of a credit card transaction is substantially reduced to a relatively small access fee for credit card account information, thereby making the process affordable for merchants who make limited and even insignificant credit card transactions.

These and other objects, features, advantages and alternative aspects of the present invention will become apparent to those skilled in the art from a consideration of the following detailed description taken in combination with the accompanying drawings.

DETAILED DESCRIPTION OF THE INTENTION

Reference will now be made to the drawings in which the various elements of the present invention will be given numerical designations and in which the invention will be discussed so as to enable one skilled in the art to make and use the invention. It is to be understood that the following description is only exemplary of the principles of the present invention, and should not be viewed as narrowing the claims which follow.

Figure 1:
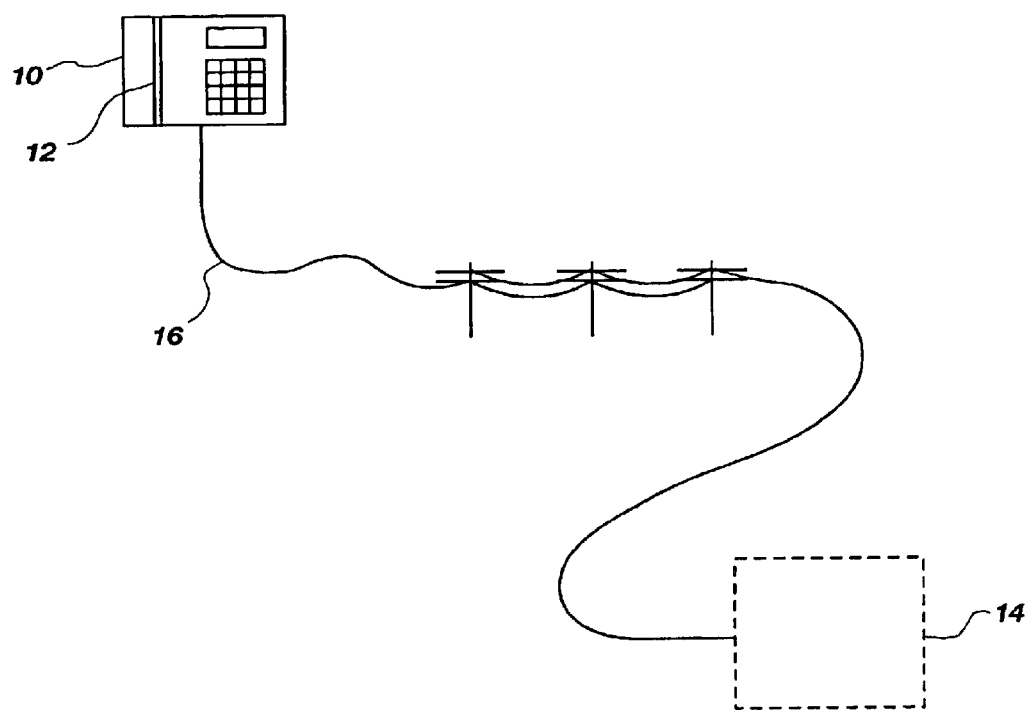
FIG. 1 is a block diagram of the basic prior art elements involved in a credit card transaction utilizing dedicated transaction equipment, including a credit card swipe machine.

The preferred embodiment of the present invention comprises both a method and apparatus for making credit card transactions which is advantageously more cost effective than the prior art. Specifically, the cost of a credit card swipe machine 10 (see FIG. 1) is avoided by utilizing an alternative method of sending credit card information to a credit card processing or information center 14. By not using a credit card swipe machine, the high initial purchase price or relatively high rental fee is avoided.

Figure 2:
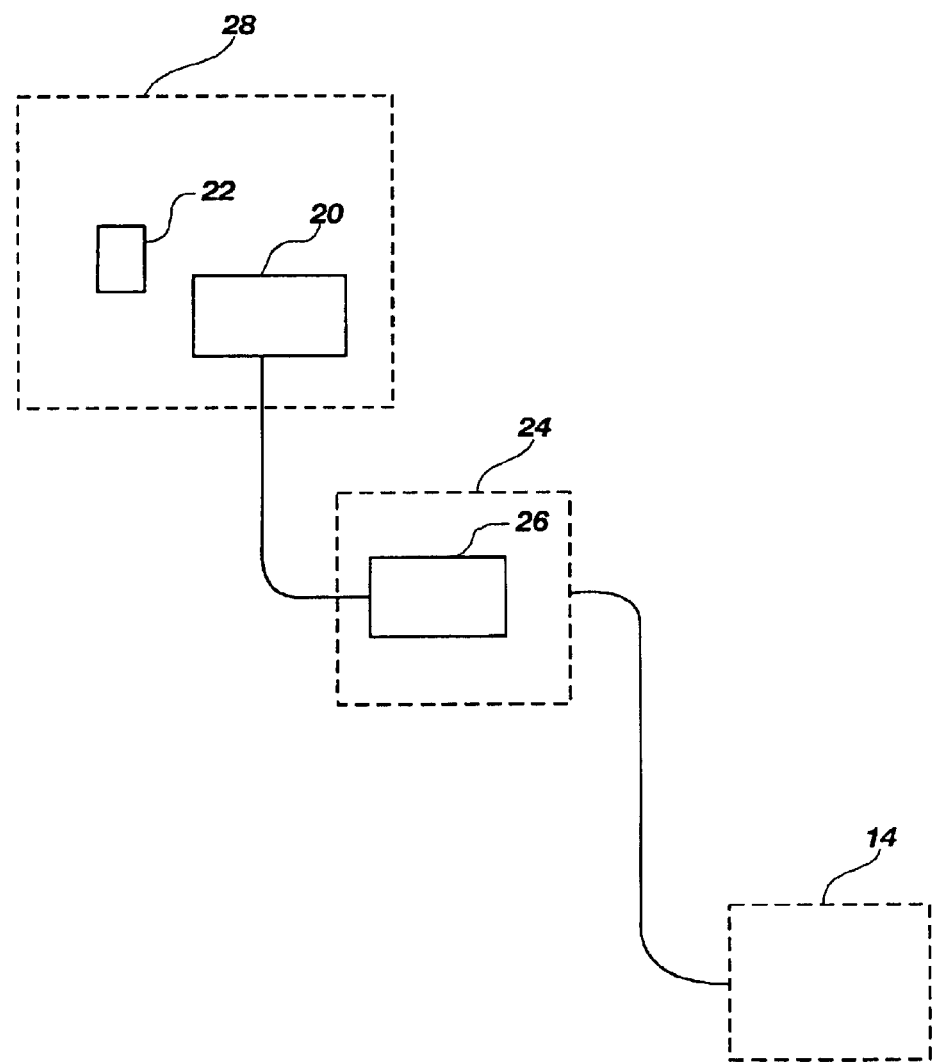
FIG. 2 is a block diagram of a presently preferred embodiment of the present invention, including the facsimile machines and Internet access for reducing costs of credit card verification.

A brief summary of the method and apparatus of the present invention is therefore as follows. Instead of using the swipe machine 10, FIG. 2 shows that the presently preferred embodiment of the present invention contemplates utilizing a first facsimile machine 20 at the site of the transaction 28. Accordingly, a merchant or a customer fills out a transmittal form 22 by handwriting or typing relevant information. The relevant information required for the process is the amount of the purchase, and information which can identify the credit card account. It may also be necessary to provide a name of the customer as well. It should also be observed that if address verification of the card holder is submitted, including the ZIP code, that the lowest rate is obtained for verification of account information. Therefore, it should be understood that the amount and type of information which is submitted via the transmittal form 22 can vary substantially, depending upon the interests of the merchant and the card holder.

Once a transmittal form 22 has been completed, the merchant transmits it via the first facsimile machine 20. To avoid the cost of typical long distance telephone rates, the merchant advantageously dials a toll free number of a pre-processing center 24. The pre-processing center 24 is an intermediate location between the credit card processing center 14 and the location 28 of the merchant. A second facsimile machine 26 at the pre-processing center 24 receives a facsimile of the transmittal form 22 which was sent from the merchant via the first facsimile machine 20.

The next step is to process the transmittal form 22. Processing typically includes converting the information into a format which is required by the credit card processing information center 14. In the most basic sense, this means preparing the information to be transmitted in an electronic format which is different from the electronic format of the facsimile transmission. This typically means a digital data format. Once converted, the data is then transmitted to the credit card processing information center 14. The credit card processing information center 14 determines whether the credit card transaction is approved or disapproved based upon criteria which are not relevant to the present invention. What is important is that the approval status, either positive or negative, is then transmitted back to the pre-processing center 24. From there, the approval status is transmitted to the merchant's location 28 via facsimile from the second facsimile machine 26 to the first facsimile machine 20.

These surprisingly simple steps not only result in a substantial savings to merchants in processing a credit card transaction, they also enable businesses to accept credit cards for purchases which would otherwise be turned away because of the prohibitively high initial costs of using typical credit card access methods and apparatus.

Figure 3:
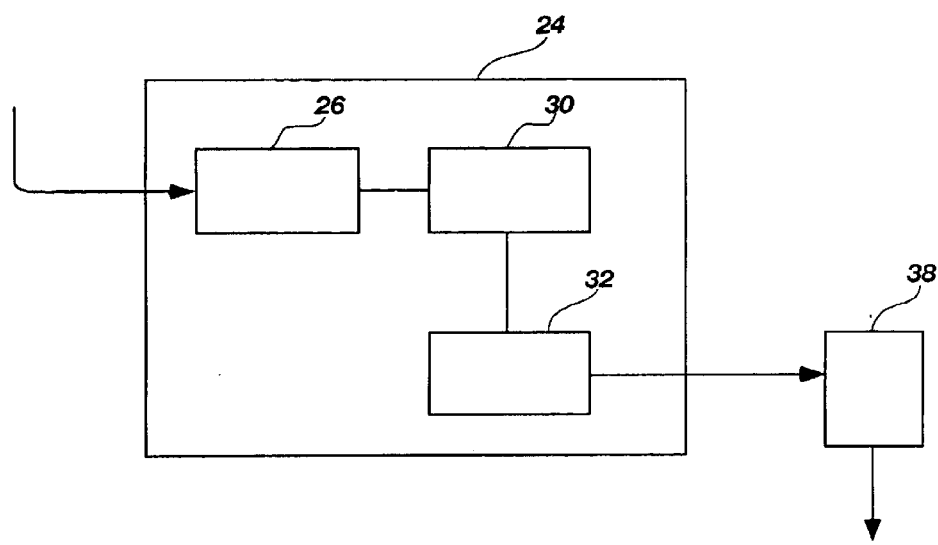
FIG. 3 is a close-up block diagram of the elements of the pre-processing center of the present invention.

Although the preferred embodiment in itself offers surprising advantages in cost reduction, there are many details of the process and alternatives which bear explanation. First, processing of the transmittal form is preferably automated to make the overall process not only more free from human error, but also less labor intensive. Consequently, FIG. 3 shows that the transmittal form 22 is preferably delivered automatically from the second facsimile machine 26 to a document reader 30. The document reader 30 scans the transmittal form 22 for the relevant information. When the information is retrieved, it is then transmitted via a general purpose computer 32 which has access to the Internet 38.

Figure 4A:
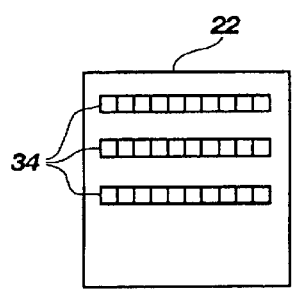
FIG. 4A is top view of a preferred embodiment of a transmittal form utilized in conjunction with the apparatus of FIG. 2, which includes spaces for handwritten or typed block letters and numbers.
Figure 4B:
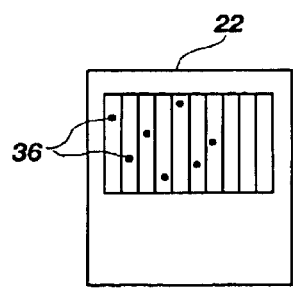
FIG. 4B is a top view of an alternative embodiment of a transmittal form utilized in conjunction with the apparatus of FIG. 2, which includes bubbles for darkening instead of spaces for block characters.
Figure 4C:
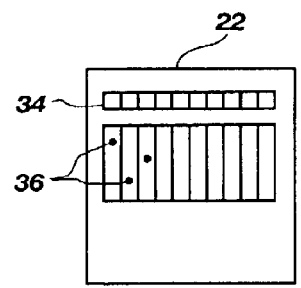
FIG. 4C is a top view of an alternative embodiment of a transmittal form utilized in conjunction with the apparatus of FIG. 2 which combines block characters and bubbles for darkening.

The document reader 30 can operate in various ways depending upon the format by which the information is recorded on the transmittal form 22. For example, FIG. 4A shows that the transmittal form 22 can have predefined spaces 34 for letters and numbers to be written in block format. Alternatively, FIG. 4B shows that the predefined spaces can consist of bubbles 36 which are darkened by pencil or pen as is commonly known in the art. Another option as shown in FIG. 4C is to combine the block letters and numbers 34 with the darkening of bubbles 36 to provide more accuracy. What is important to realize from the embodiments of the transmittal form 22 is that many different types of forms which encode data in different ways can all be utilized by the present invention. However, it is an advantageous concept that the transmittal form can be submitted via facsimile.

While it has been suggested that the only information contained the transmittal form 22 is purchase amount and card holder identification and account information, it is another advantageous concept to include more information. For example, it is possible that a portion of the transmittal form 22 be standardized purchase amount and identification information as previously described. The remaining portion of the transmittal form 22 is dedicated to product information. For example, the product information might also include order information. In this way, a card holder could submit the transmittal form 22 which specifically identifies a product(s) that is to be purchased, along with the accompanying purchase amount, card holder and account identification information. Consequently, a complete credit card transaction can take place when the transmittal form 22 is submitted to the pre-processing center 24.

While the purpose of the transmittal form 22 is to make it as simple as possible to obtain credit card account information and purchase information, it must be remembered that the nature of the information is sensitive financial data, the possession of which would enable anyone to make credit card purchases. Therefore, it is possible to enable encryption of information through the use of an encryption key. In this way, the facsimile machines can be ordinary machines, and not costly machines which have specialized hardware, software or firmware.

Because of the nature of the information being transmitted, it is also possible that the transmitting merchant will desire to receive confirmation that the credit card information was received by the intended recipient. In other words, the merchant will feel more confident in the process if after transmitting the information, the second facsimile machine 26 at the pre-processing center 24 sends back confirmation of the information received. This confirmation could be a simple acknowledgement that information was received without going into specifics. Alternatively, the confirmation could include all the information which was transmitted and read electronically. In this way, the confirmation could not only assure the sender that the information was received, but that it was correctly understood by the document reader 30 of the automated pre-processing center 24.

In another aspect of the confirmation process, it is envisioned that the pre-processing center 24 might be able to identify the source of an error when one occurs, or at least provide some helpful information to the merchant about why the error as occurred.

Once the credit card and purchase amount information is received at the pre-processing center 24, the information is converted into an electronic format. In other words, the information is digitized because that is what the credit card processing information center 14 expects to receive, whether from an interface to the credit card swipe machines, or via the Internet 38.

A first aspect of the digitization process concerns the specific method and apparatus used to actually "read" the transmittal form 22 and digitize the information. In the preferred embodiment, the document reader 30 accomplishes its function by way of optical character recognition software being run on a general purpose computer. Of course, this assumes that the transmittal form 22 has handwritten or typed block letters and numbers, and not just the darkened bubbles which would not require as sophisticated a system. However, in the interests of ease of use and to make the process as fast as possible (and thus still convenient for the customer), the preferred method of filling out the transmittal form 22 is to exclusively use block characters. Those skilled in the art of optical character recognition software and hardware understand how the system is able to function as desired.

In an issue relating back to the confirmation notification, it is a part of the method and apparatus that after the information has been digitized by the optical character recognition software and hardware, that the information should be checked for errors. Although it is understandably impossible to determine whether the merchant has transmitted all of the correct information unless it is sent back to the merchant, it might be possible to determine whether a number is missing in the credit card account, or if the expiration date of the card is valid.

In another aspect of the digitization process, it should be apparent that there is more than one way to digitize the information. For example, digitizing includes not only replacing numbers and letters with a computer equivalent such as in a binary or hexadecimal based format, it also includes the ability to encode the data before it is transmitted to the credit card processing information center 14. In this way, security of the information is more assured than if no encoding is carried out. Again, the likely method is to use encryption keys which are automatically used in the automated process.

Once the information is digitized and ready for transmission to the credit card processing information center 14, access thereto is provided by utilizing the Internet 38 as shown in FIG. 3. Specifically, a general purpose computer 32 located at the pre-processing center 24 connects to the Internet 38 via any Intern service provider, or through a dedicated connection thereto. Accessing the credit card processing information center 14 via the Internet 38 avoids the more proprietary access path of the swipe machines. Furthermore, whereas a swipe machine 10 must access the credit card processing information center 14 through a toll call via a publicly switched telephone network, the present invention utilizes the Internet 38, and thus avoids any long distance calling charges. By placing a plurality of pre-processing centers 24 in major cities, interstate telephone calls can be eliminated from the entire system. Only intrastate local and long distance calls are then required to access the pre-processing center 24. By obtaining bulk calling rates utilizing a toll free number and by further reducing the cost by making all calls local, the present invention obtains even more savings.

Utilizing the Internet 38 for transmission of digital data raises more issues about the format of the digital data. For example, transmission of data via the Internet 38 requires that the data be properly prepared for transmission. This means that the data is encapsulated within packets of information. The packets are prepared in accordance with standard Internet protocols. For example, the transmission control protocol/internet protocol (TCP/IP) is a common Internet format. Even the encoded data can be packeted for transmission utilizing a selected Internet protocol.

Once the credit card processing information center 14 has determined whether the credit card transaction is approved or rejected, an approval status code is typically transmitted to the merchant. In the present invention, the approval status code is first transmitted to the pre-processing center 24. The approval status code is first un-encapsulated from its Internet protocol. If the approval status code was also encoded, it is then un-encoded. Finally, the second facsimile machine 26 transmits the approval status code, whether it is positive or negative, to the merchant.

It is an important and an advantageous principle of the present invention to realize that the first facsimile machine 20 being used by the merchant can be replaced with a general purpose computer which is capable of facsimile transmissions. Such a general purpose computer would include an electronic form of the transmittal form 22. The merchant will type in the information, and then transmit the transmittal form via a facsimile transmission utilizing facsimile software and a modem to the pre-processing center 24.

Likewise, it is an inventive principle that the second facsimile machine 26 could be replaced by a general purpose computer which has the capability of sending facsimile transmissions without having to "read" a hardcopy of what is to be transmitted. In other words, the general purpose computer can transmit to and receive information from another facsimile machine, or a general purpose computer which can transmit facsimiles.

While very little specific examples of the cost reductions have been provided, it is now useful to consider some of the fees involved. Specifically, it is the case that accessing the credit card processing information center 14 to determine approval of a credit card transaction generally requires no more than seven or eight cents per transaction. Consequently, the entire fee structure for approving credit card transactions utilizing the method and apparatus of the present invention can be quite reasonable on a per transaction basis, as compared to the high initial start-up costs, and probably larger access fees via a toll free but out-of-state long distance access charges to the credit card processing information center 14 which are likely to be passed to the merchant.

Another important issue to address in an alternative embodiment is the utilization of a transmission medium other than the Internet 38 (see FIG. 3) for the pre-processing center 24 to utilize when communicating with the credit card processing information center 14. While communication via the Internet is the preferred embodiment because of the ubiquitous and expanding access thereto, it is another important principle of the present invention to include a direct link. In other words, a dedicated communications link such as a privately leased line can also be utilized to provide access between the pre-processing center 24 and the credit card processing information center 14. This arrangement can result in other advantages such as enhanced security and faster access rates. The reason for access which is not Internet-based is simply owing to the changing nature of the Internet as it evolves as a communications medium.

It is to be understood that the above-described arrangements are only illustrative of the application of the principles of the present invention. Numerous modifications and alternative arrangements may be devised by those skilled in the art without departing from the spirit and scope of the present invention. The appended claims are intended to cover such modifications and arrangements.

What is claimed is:

1. A method for making a credit card transaction utilizing a facsimile machine to transmit information to a credit card processing center, and thereby enable a small volume of credit card transactions to be affordable, said method comprising the steps of:
   (1) imprinting information relevant to the credit card transaction on a transmittal form;
   (2) transmitting the information on the transmittal form from a first facsimile transmission/reception capable machine to a second facsimile transmission/reception capable machine at a first processing location;
   (3) converting the information on the transmittal form to an electronic format which is suitable for delivery to a credit card processing information center;
   (4) accessing the credit card processing information center and transmitting the electronic format of the information thereto for determination of whether the credit card transaction is allowable;
   (5) receiving an approval status from the credit card processing information center at the first processing center; and
   (6) transmitting the approval status of the credit card transaction to the first facsimile transmission/reception capable machine.

2. The method as defined in claim 1 wherein the method further comprises the step of placing a purchase amount and a credit card number for identifying a credit card account on the transmittal form.

3. The method as defined in claim 1 wherein the method further comprises the step of confirming receipt of the information by transmitting a received message from the second facsimile machine to the first facsimile machine.

4. The method as defined in claim 1 wherein the method further comprises the step of utilizing optical character recognition software to convert the information placed on the transmittal form to the electronic format.

5. The method as defined in claim 4 wherein the method further comprises the step of utilizing optical character recognition hardware to convert the information placed on the transmittal form to the electronic format.

6. The method as defined in claim 5 wherein the method further comprises the step of transmitting an error message from the second facsimile machine to the first facsimile machine if not all required information was received.

7. The method as defined in claim 6 wherein the method further comprises the step of identifying a source of error for all of the required information not being received, and then transmitting an error message from the second facsimile machine to the first facsimile machine which identifies the source of error.

8. The method as defined in claim 5 wherein the step of converting the information placed on the transmittal form to the electronic format further comprises the step of digitizing the information.

9. The method as defined in claim 1 wherein the method further comprises the step of encoding the electronic format of the information which is suitable for delivery to a credit card processing information center.

10. The method as defined in claim 1 wherein the method further comprises the step of accessing the credit card processing information center via the Internet.

11. The method as defined in claim 10 wherein the method further comprises the step of encapsulating the electronic format of the information, which is suitable for delivery to the credit card processing information center, within at least one packet of information which is suitable for delivery via the Internet.

12. The method as defined in claim 11 wherein the method further comprises the step of utilizing an Internet protocol for communicating with the credit card processing information center.

13. The method as defined in claim 1 wherein the method further comprises the step of accessing the credit card processing information center via a dedicated access line.

14. The method as defined in claim 1 wherein the method further comprises the step of accessing the first processing center via a call to a toll free number to thereby decrease a total cost of the credit card transaction while minimizing long distance telephone fees charged to the toll free number.

15. The method as defined in claim 1 wherein the method further comprises the steps of:
    (1) receiving a positive or a negative approval status for the credit card transaction from the credit card processing information center at the first processing center; and
    (2) transmitting the positive or the negative status to the first facsimile machine from the second facsimile machine.

16. The method as defined in claim 1 wherein the method further comprises the step of charging a fee for accessing the first processing center, and for accessing the credit card processing information center, regardless of a positive or a negative approval status of the credit card transaction.

17. The method as defined in claim 1 wherein the method further comprises the step of writing by hand or typing the information on the transmittal form, and wherein the transmittal form has designated areas for specific types of information required to approve the credit card transaction process.

18. The method as defined in claim 1 wherein the method further comprises the step of including product information on the transmittal form, to thereby enable a specific product to be identified as a subject of the credit card transaction, and to enable purchasing of the specific product after approval of the credit card transaction.

19. A system for making a credit card transaction utilizing a facsimile machine to transmit information to a credit card processing center, and thereby enable a small volume of credit card transactions to be affordable, said system comprising:

means for having recorded thereon information relevant to the credit card transaction at a transaction location;

means for transmitting the information from the transaction location to a first processing location;

means for receiving the information at the first processing location;

means for converting the information to an electronic format which is suitable for delivery to a credit card processing information center; and means for accessing the credit card processing information center and transmitting the electronic format of the information thereto for determination of whether the credit card transaction can be approved, and for receiving an approval status from the credit card processing information center at the first processing center.

20. The system as defined in claim 19 wherein the means for converting the information to an electronic format which is suitable for delivery to a credit card processing information center is comprised of optical character recognition software running on a general purpose computer.

21. The system as defined in claim 19 wherein the means for accessing the credit card processing information center and transmitting the electronic format of the information thereto, and for receiving an approval status from the credit card processing information center is comprised of a general purpose computer which has an Internet access connection, and wherein the general purpose computer is capable of executing Internet protocols which enable it to communicate bi-directionally with the credit card processing information center.

22. The system as defined in claim 19 wherein the means for having recorded thereon information relevant to the credit card transaction at a transaction location is comprised of a general purpose computer which is capable of transmitting facsimile information which is stored as digital information within the general purpose computer.

* * * * *